July 23, 1929.  W. L. MARTIN  1,721,568
VEHICLE BRAKE
Original Filed Jan. 17, 1924
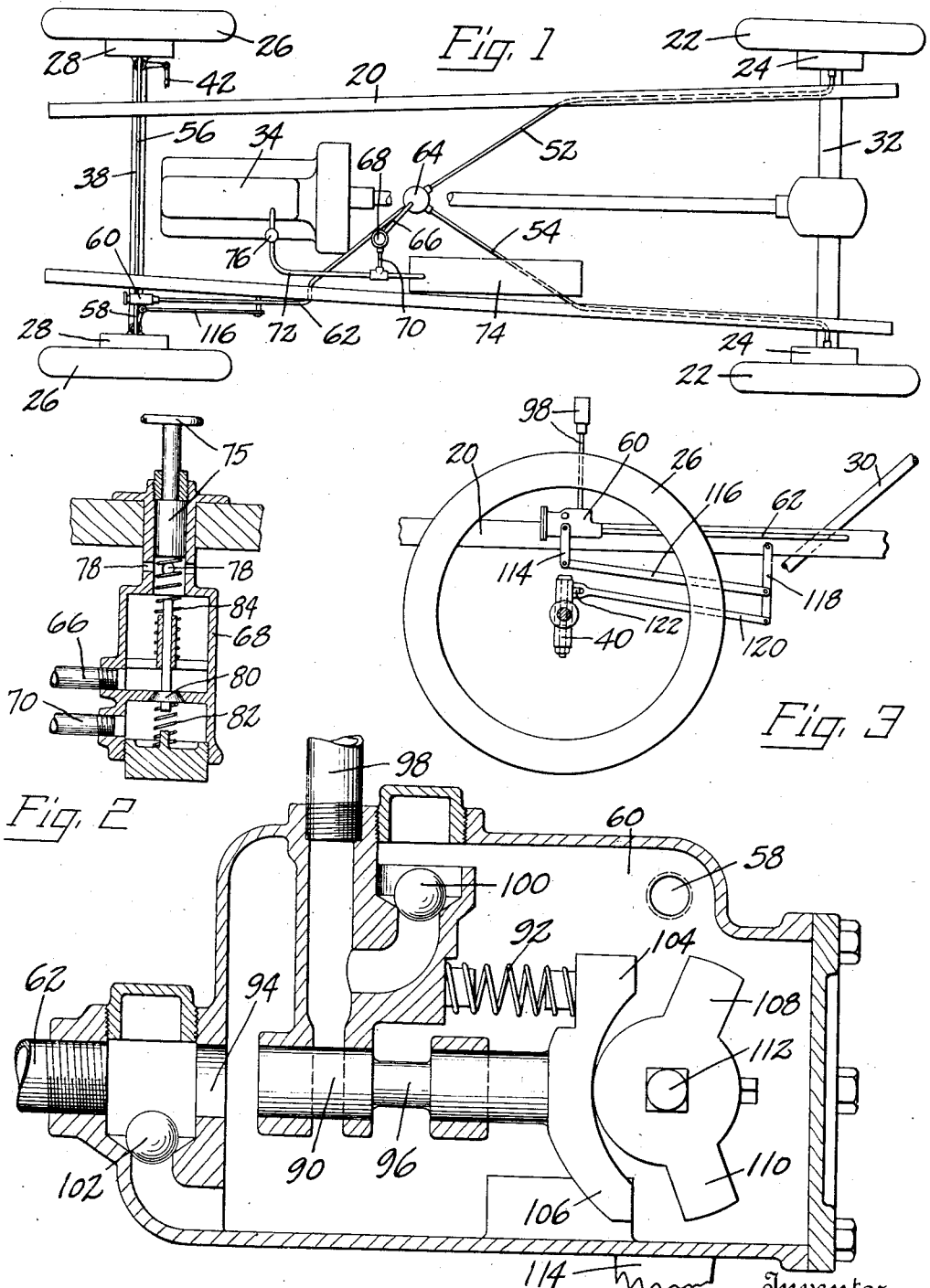
Inventor
William Lincoln Martin
By his Attorneys Patented July 23, 1929.

1,721,568

UNITED STATES PATENT OFFICE.

WILLIAM LINCOLN MARTIN, OF DETROIT, MICHIGAN, ASSIGNOR TO GENERAL MOTORS CORPORATION, OF DETROIT, MICHIGAN, A CORPORATION OF DELAWARE.

VEHICLE BRAKE.

Original application filed January 17, 1924, Serial No. 686,936. Divided and this application filed January 31, 1924. Serial No. 689,647.

This invention relates to brakes, and is a division of my co-pending application No. 686,936, filed January 17, 1924, and is a continuation of my prior application No. 626,969, filed March 22, 1923, as to all matters common to the two applications.

The present application relates to varying the pressure on a pair of brakes as the vehicle rounds a corner, as for example by relieving the pressure on fluid which operates the brakes on a pair of dirigible wheels, in order to make sure that steering control of the vehicle will not be lost by locking the brakes and skidding the wheels. In one desirable arrangement the pressure on the fluid is varied by a valve operated by swiveling movement of the wheels.

Various objects and features of the invention, including novel combinations of parts and desirable particular constructions, will be apparent from the following description of one illustrative embodiment shown in the accompanying drawings, in which:

Figure 1 is a top plan view of an automobile chassis embodying my invention;

Figure 2 is a vertical section through a driver-operated control valve;

Figure 3 is a diagrammatic side elevation of part of the front end of the car, showing the valve-controlling connections which are operated by swiveling the wheels.

Figure 4 is a vertical section through the valve which is operated by swiveling movement of the wheels.

The invention is shown as embodied in an automobile chassis comprising a frame 20 supported by rear wheels 22 having brake drums 24 and by dirigible front wheels 26 having brake drums 29. The front wheels are controlled by steering mechanism 30 actuating the wheels by means of the usual linkage including the cross rod 42. The rear wheels 22 are carried and driven by a rear axle 32 driven by an engine 34 in the usual manner, and the front wheels are carried by a front axle 38 having knuckles 40 swiveled thereto. A non-freezing liquid, or other fluid, is supplied to each brake through suitable leads, the leads for the two rear brakes being in communication with conduits 52 and 54, and for the two front brakes being in communication with conduits 56 and 58 connected with the valve 60 described below. Liquid enters valve 60 from a conduit 62, the three conduits 52, 54, and 62 leading from a liquid reservoir 64.

Pressure is applied to the liquid in reservoir 64, to apply the brakes, by compressed gas entering through a conduit 66 from a driver-operated valve 68 controlling a passage 70 from a conduit 72 opening at one end into a gas tank 74 and at the other end receiving exhaust engine gases through a check valve 76. The valve 68 comprises a plunger 75 which is depressible against the resistance of a spring 84 to close exhaust openings 78 and then to depress a valve member 80 against the resistance of its spring 82.

The present application relates to varying the pressure on the brakes in rounding a corner, so that steering control cannot be lost by reason of the wheels being locked by the brakes in such as manner as to skid, and also to the valve 60 shown as one desirable means for securing the desired variation in pressure. This valve is best shown in Figure 4, and its operating connections in Figure 3.

This valve comprises a fluid-tight casing secured to the chassis frame, and into which conduit 62 opens and from opposite sides of which conduits 56 and 58 lead. Communication with conduit 62 is controlled by a plunger 90, movable against the resistance of a spring 92 to close an opening 94 to shut off conduit 62, and which has an annular passage 96 which places the inside of the casing, and therefore conduits 56 and 58, in communciation with a standpipe 98 in which the liquid from these two conduits may rise to relieve the pressure on the brakes. When the valve 68 is released, fluid from standpipe 98 can return to the valve casing by way of a check valve 100, and from the valve casing to conduit 62 by way of a check valve 102 upon releasing the brakes by permitting the plunger 75 to rise, regardless of the position of plunger 90.

Plunger 90 is provided with a head having opposite arms 104 and 106, one of which is engaged when the vehicle rounds a corner by one of two cam arms 108 and 110 on a shaft 112 rocked by an operating arm 114. Arm 114 is connected by a link 116 to an idler arm 118 pivoted on the chassis frame at the rear end of the front spring, the idler arm 118 being in turn connected by a link 120 to an arm 122 rigid with one of the knuckles 40. Thus when the wheels are swiveled by manipulation of the steering mechanism 30, links 120 and 116, and arms 118 and 114, are operated by arm 122 to move plunger 90 axially to relieve any braking pressure there may be on both of the front brakes. There is sufficient lost motion before cam arm 108 or 110 engages arm 104 or 106, however, so that the brakes are not affected by such slight changes in the position of the steering mechanism as are necessary on the straight-away, as in passing slower vehicles, etc.

While one embodiment of my invention has been described in detail, it is not my intention to limit its scope to that particular embodiment, or otherwise than by the terms of the appended claims.

I claim:

1. A vehicle comprising, in combination, a pair of dirigible wheels having fluid-operated brakes, and means operated by swiveling movement of the wheels to vary the operation of both brakes, the variations, in the case of both brakes being substantially the same.

2. A vehicle comprising, in combination, a pair of dirigible wheels, a brake for each wheel, driver-controlled fluid means for applying the brakes, and means operated by swiveling movement of the wheels to vary the operation of both brakes, the variations, in the case of both brakes being substantially the same.

3. A vehicle comprising, in combination, a pair of dirigible wheels having brakes, fluid pressure means to operate both brakes, connections for supplying fluid under pressure to said devices, and a valve operated by swiveling movement of the wheels to vary the pressure in said connections, the variations in pressure in said connections being substantially the same.

4. A vehicle comprising, in combination, a pair of dirigible wheels having brakes, a fluid pressure device to operate each brake, conduits to supply fluid under pressure to both said devices, and a valve connected to the conduits and operated by swiveling movement of the wheels to vary the pressure in the conduits, the variations of pressure in said conduits being substantially the same.

5. A vehicle comprising, in combination, a pair of dirigible wheels having brakes, a fluid pressure device to operate each brake, conduits to supply fluid under pressure to both said devices, and a valve connected to the conduits and operated by swiveling movement of the wheels to relieve the pressure in the conduits to release both brakes.

6. A vehicle comprising, in combination, rear wheels having brakes, a pair of dirigible front wheels having brakes, a fluid pressure device to operate each brake, conduits to supply fluid under pressure to all said brakes, and a valve connected to the conduits and operated by swiveling movement of the front wheels to vary the pressure in the front brake conduits without affecting the pressure in the rear brake conduits.

7. A vehicle comprising, in combination, brakes, a fluid-pressure device for operating each brake, swiveled dirigible wheels, and means for varying the pressure on a plurality of said devices when the wheels are swiveled, the variations in pressure in each of said plurality of devices being substantially the same.

8. A vehicle comprising, in combination, fluid-operated brakes, connections for supplying fluid under pressure to said brakes, dirigible wheels, and a valve operated by swiveling movement of the wheels beyond a predetermined angle to vary the pressure in the connections for a plurality of brakes, the variations in pressure in each of said connections being substantially the same.

9. A vehicle comprising in combination a pair of dirigible wheels having each a brake adapted to be applied by fluid pressure, a valve casing; conduits leading from said valve casing to and through which fluid may flow to operate said brakes; a supply conduit through which fluid under pressure is supplied to said valve casing; and a valve operated by movement of said wheels for interrupting the supply of fluid under pressure to said valve casing and for relieving the pressure in said casing and in said two first mentioned conduits.

10. A vehicle having rear and dirigible front wheels and a brake for each wheel, and comprising, in combination, conduits for transmitting fluid pressure to the brakes, and a valve controlled by steering movement to the front wheels to vary the pressure in the front brake conduits while maintaining the pressure in the rear brake conduits.

11. In a vehicle brake mechanism, the combination with the steering wheels of a vehicle, of fluid operated brake appliances respectively associated with said wheels, steering mechanism for said wheels, a pipe through which fluid pressure is transmitted to said appliances, and a valve controlling the flow through said pipe and under automatic control of said steering mechanism to prevent application of the brakes to the front wheels when the same have undergone steering movement through a predetermined angle.

12. In a vehicle brake mechanism, the combination with the steering wheels of a vehicle, of fluid operated brake appliances respectively associated with said wheels, a pipe transmitting fluid pressure to said appliances, branch pipes leading to the respective front wheels from the first mentioned pipe, a casing through which said three pipes are adapted to communicate, a valve in said casing controlling the transmission of fluid pressure to the branch pipes from the first mentioned pipe, steering mechanism for the front wheels and automatic control means for said valve operable by said steering mechanism to relieve pressure within said branches upon a predetermined steering movement of the wheels.

13. A vehicle comprising, in combination, dirigible wheels having brakes, fluid means for operating the brakes, and a device operated by turning the wheels to relieve the pressure on both brakes.

14. In a vehicle brake mechanism and in combination with dirigible steering wheels having brakes, a fluid operated device associated with each brake to apply it, and steering mechanism for steering the vehicle; conduits through which fluid presure is transmitted to both said brake applying devices; and means associated with said conduits and controlled by said steering mechanism for increasing the total volume of said conduits, to thereby reduce the pressure therein.

15. In fluid pressure brakes for dirigible vehicles having brakes upon the rear or drive wheels and brakes upon the front or directing wheels, all operable through conduits from a common pressure cylinder, means for regulating the braking effect upon the front wheels, said means comprising a valve in the conduit leading thereto, means operable to maintain said valve open during straight line progression of the vehicle and other means operable by steering movement of the directing wheels to permit closing of the valve and to increase the total volume of the said conduit whereby pressure is reduced therein.

16. In brake mechanism for dirigible vehicles, rear and directing wheels having brakes, and means for disconnecting both directing wheel brakes from the operating devices when said wheels are turned from alignment with the axis of the vehicle, whereby the directing wheel brakes are inoperative when said vehicle is in the act of turning.

17. The combination with a pair of steering wheels of fluid pressure operated means for braking the wheels equally in a straight ahead movement, means whereby the braking of the respective wheels is equal upon swivelling said steering wheels up to a predetermined steering movement, and means automatically operable upon a swivelling movement beyond said predetermined steering movement for relieving the braking force to said wheels.

18. The combination with a vehicle having a pair of swivelled steering wheels and a pair of non-swivelled wheels of fluid pressure operated means for braking the respective wheels equally in a straight ahead movement, means whereby the braking of the respective wheels is equal upon swivelling said steering wheels up to a predetermined steering movement, and means automatically operable upon a swivelling movement beyond the said predetermined steering movement for permitting a greater braking force to be applied to said non-swivelled wheels than to the other of said wheels.

19. The combination with a pair of steering wheels, of a fluid pressure operated means for braking said wheels, and means effective upon a steering movement of said wheels for automatically relieving the braking force applied to both of said wheels.

20. The combination with a pair of steering wheels of a fluid pressure operated brake unit for each of said wheels, a source of fluid under pressure, a supply pipe for conducting said fluid from said source to said brake units, a steering wheel control device for controlling the flow of fluid through said supply pipe, said device including a member movable upon a steering movement of said steering wheels for automatically releasing the fluid pressure applied to the steering wheel brake units upon a predetermined steering position of the steering wheels.

21. The combination with a pair of steering wheels, of a fluid pressure operated means for braking said wheels, and means for automatically relieving the fluid pressure applied to the steering wheel brakes after the steering wheels have reached a predetermined angle of steering movement and again applying the brakes automatically when this angle is reduced.

22. The combination with a pair of steering wheels, of a fluid pressure operated means for braking said wheels, and means effective upon steering movement of said wheels for automatically relieving the fluid pressure administered to both front wheel brakes.

In testimony whereof I affix my signature.

WILLIAM LINCOLN MARTIN.